US008256661B2

(12) United States Patent
VanDyke et al.

(10) Patent No.: US 8,256,661 B2
(45) Date of Patent: Sep. 4, 2012

(54) DIFFUSION BONDING

(75) Inventors: Kevin VanDyke, Chandler, AZ (US); Gigi Streeter, Okemos, MI (US); Jon Dreher, Lennon, MI (US); Larry Leyrer, Holt, MI (US)

(73) Assignee: Barnes Group Inc., Bristol, CT (US)

( * ) Notice: Subject to any disclaimer, the term of this patent is extended or adjusted under 35 U.S.C. 154(b) by 208 days.

(21) Appl. No.: 12/716,466

(22) Filed: Mar. 3, 2010

(65) Prior Publication Data

US 2010/0247949 A1 Sep. 30, 2010

(51) Int. Cl.
*B23K 31/00* (2006.01)
(52) U.S. Cl. .................. 228/193; 228/194; 228/234.1
(58) Field of Classification Search .............. 228/193, 228/194, 234.1
See application file for complete search history.

(56) References Cited

U.S. PATENT DOCUMENTS

| 3,649,425 A | 3/1972 | Alexander |
| 3,748,721 A * | 7/1973 | Alexander ............ 228/185 |
| 6,003,754 A | 12/1999 | Rhodes |
| 6,003,756 A | 12/1999 | Rhodes |
| 6,105,261 A | 8/2000 | Ecer |
| 7,653,978 B2 | 2/2010 | Arnold |

FOREIGN PATENT DOCUMENTS

| RU | 94024851 | 5/1996 |
| SU | 1407730 | 7/1988 |
| SU | 1625627 | 2/1991 |

* cited by examiner

*Primary Examiner* — Kiley Stoner
*Assistant Examiner* — Erin Saad
(74) *Attorney, Agent, or Firm* — Fay Sharpe LLP; Brian E. Turung

(57) ABSTRACT

A method of forming a part that includes a first component and a second component and which two components are diffusion bonded together. The first component is configured as a pressure component and includes a first bond land surface. The second component is configured as a suction component and includes a second bond land surface. A mandrel is provided that includes a first surface having a contour that mates with at least a portion of the first component and a second surface having a contour that mates with at least a portion of the second component. The first and second components are positioned on the mandrel so that the first bond land surface and the second bond land surface are in mating abutment. The first and second components together with the mandrel are positioned in a die assembly. The die assembly including a first die, a second die and a plurality of fastening members for releasably securing the first die to the second die. The first and second dies are formed of a first material having a first coefficient of thermal expansion. The fastening members are formed of a second material having a second smaller coefficient of thermal expansion. The die assembly is placed in a heating arrangement for a diffusion bonding cycle and this temperature of the heating arrangement is increased to a predetermined temperature. Uniform pressure is applied across an interface between the first and second bond land surfaces of the first and second components.

32 Claims, 13 Drawing Sheets

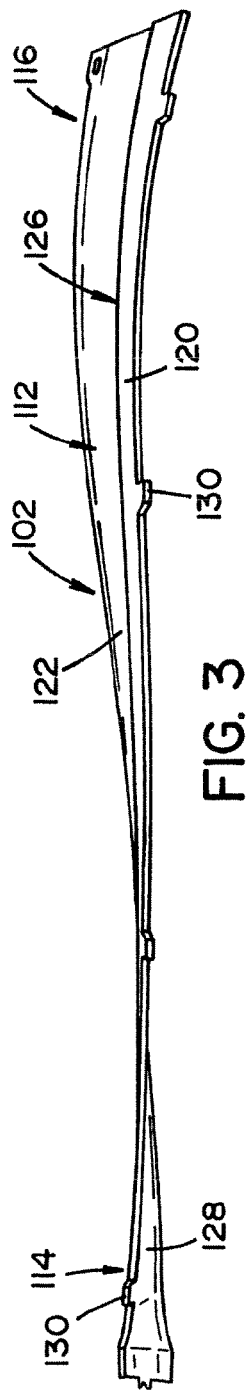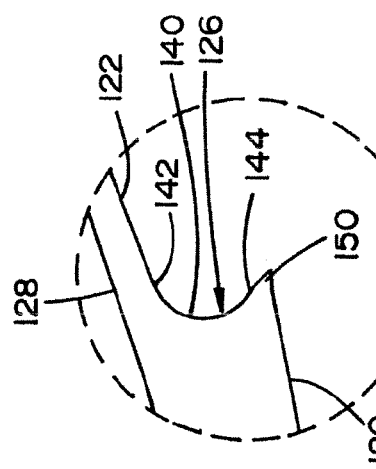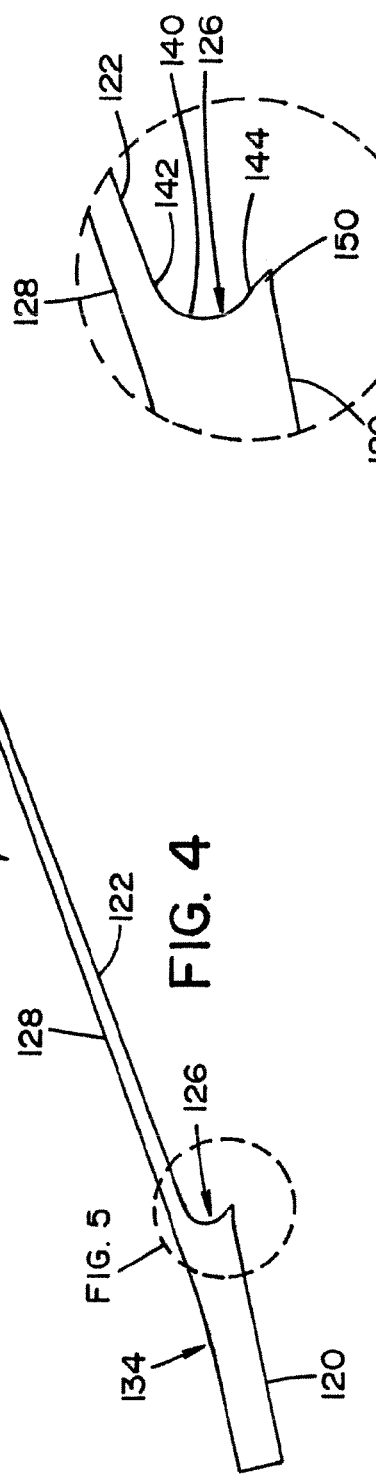

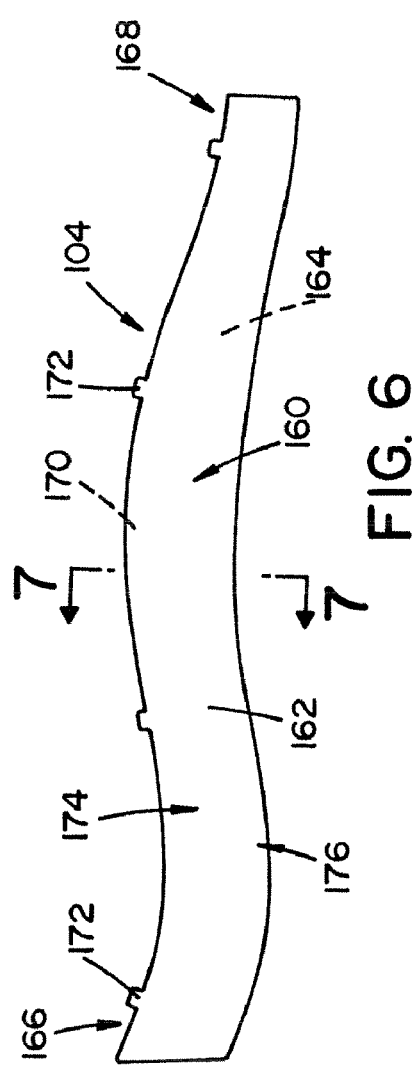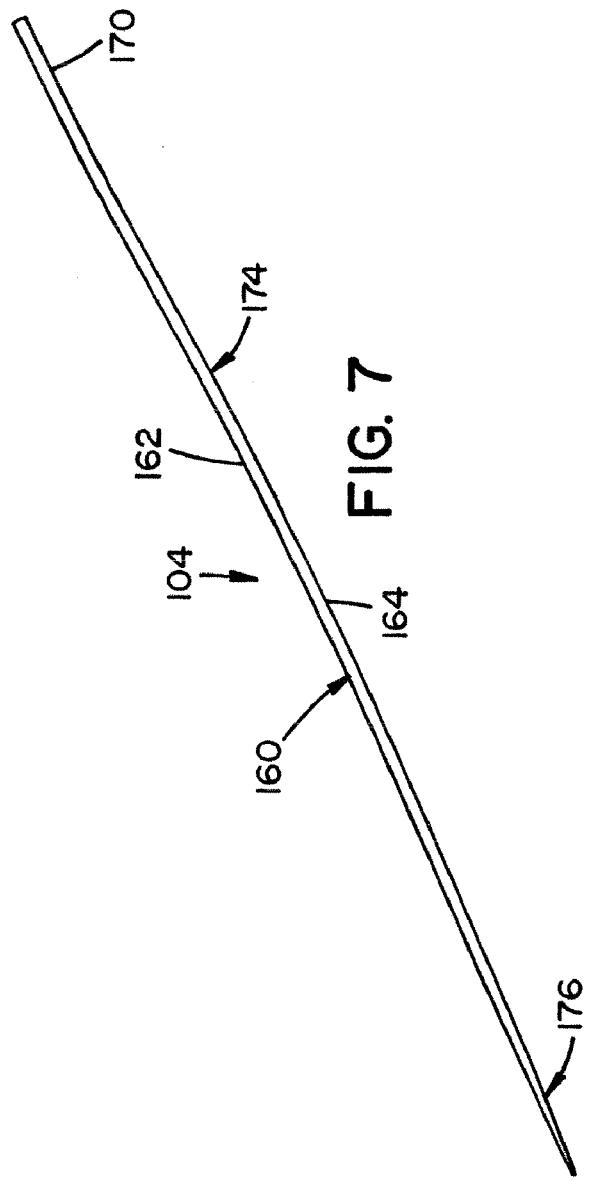

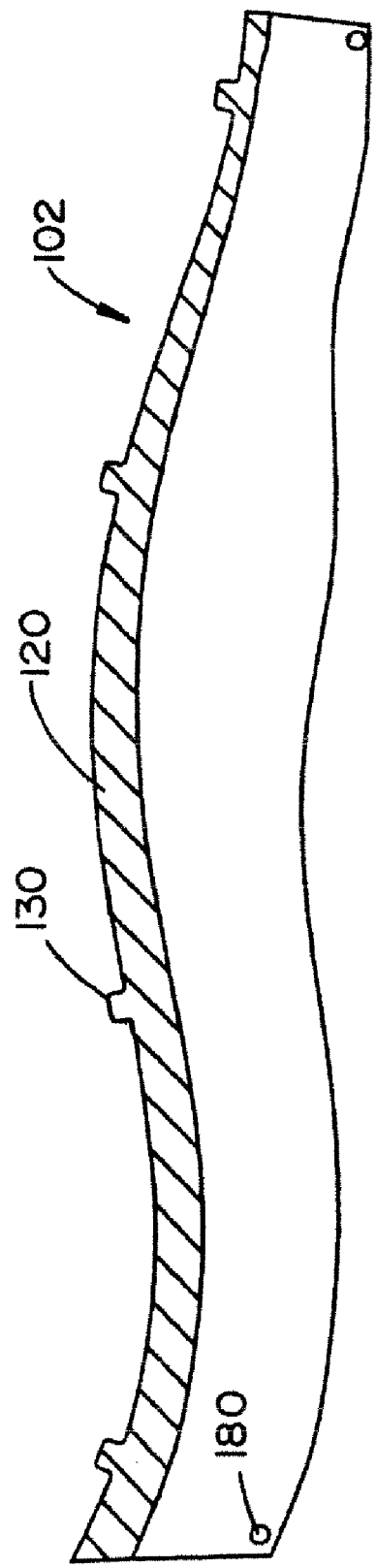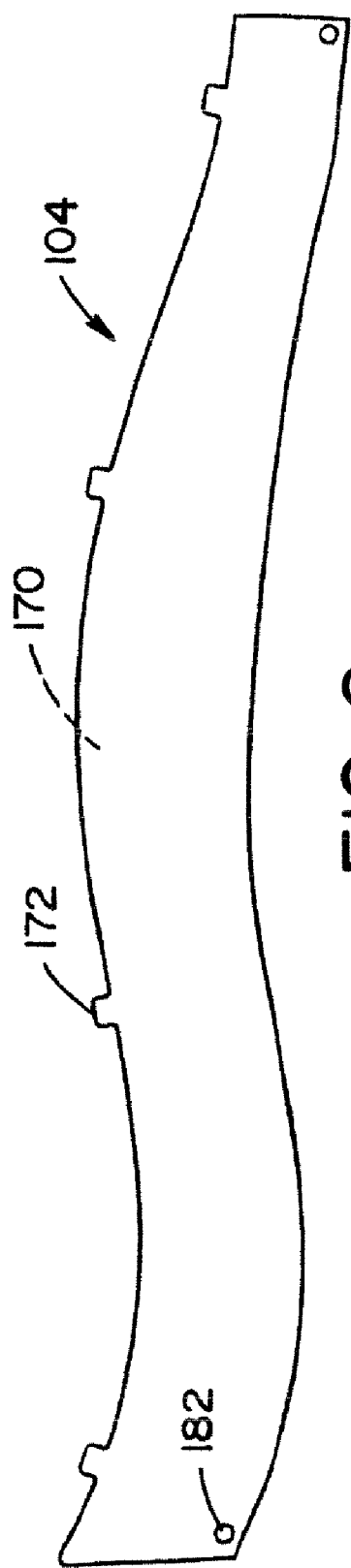

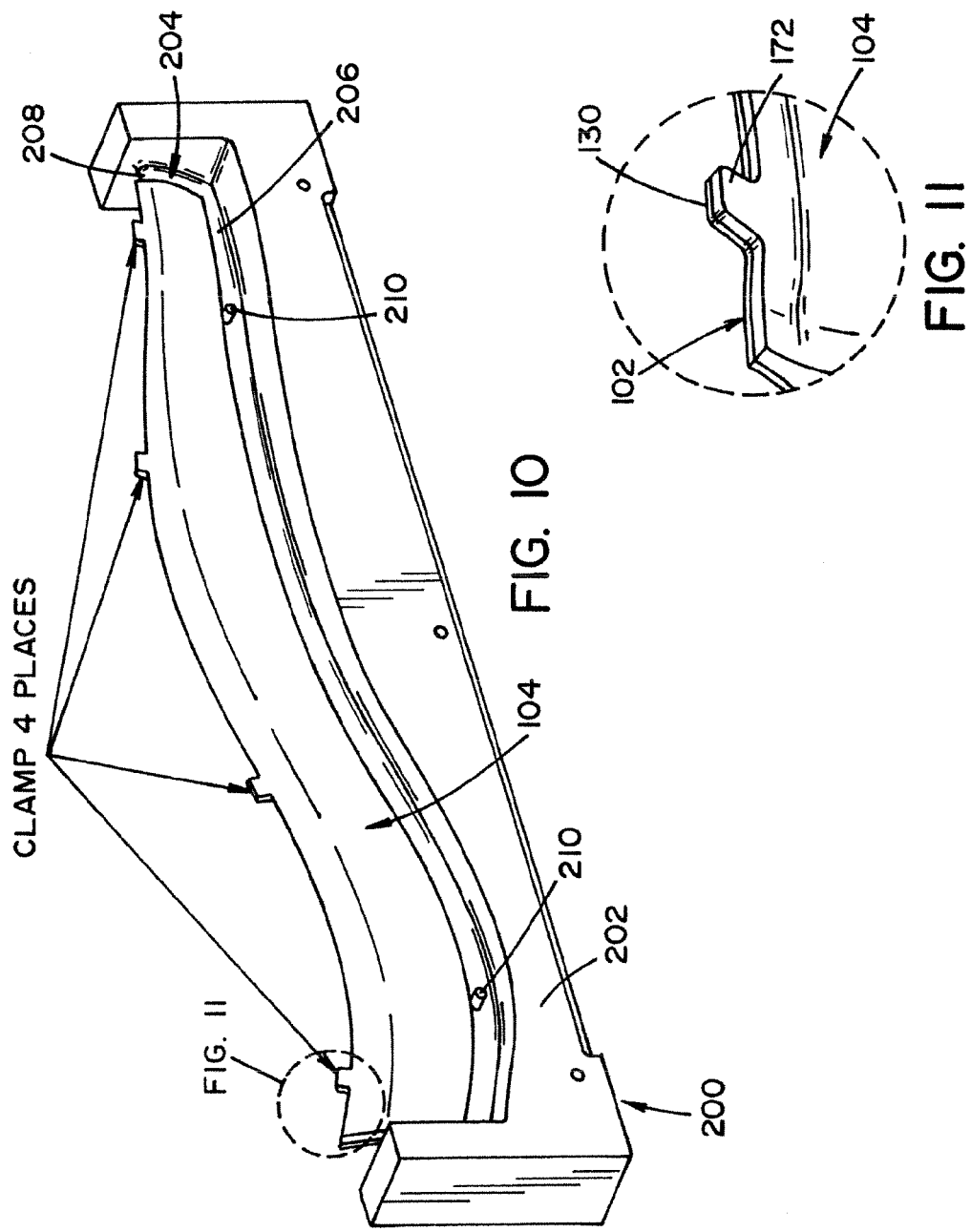

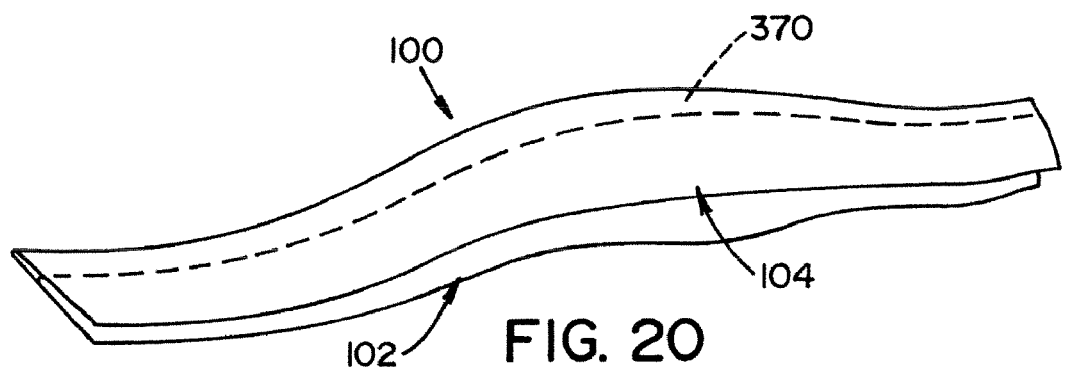
FIG. 20
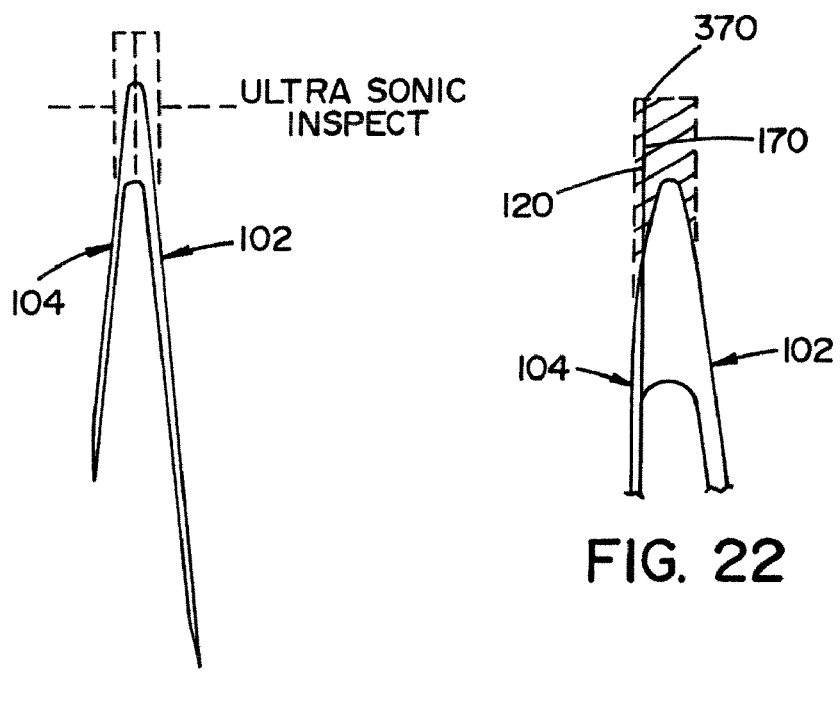
FIG. 21
FIG. 22

DIFFUSION BONDING

The present disclosure claims priority on PCT Application Serial No. PCT/US2008/076865 filed Sep. 18, 2008, which in turn claims priority on U.S. Provisional Patent Application No. 60/994,362, filed Sep. 19, 2007, now abandoned, and U.S. Provisional Patent Application No. 61/020,548, filed Jan. 11, 2008, now abandoned, the disclosures of which are incorporated herein by reference.

The present disclosure concerns improvements in or relating to diffusion bonding.

BACKGROUND OF THE INVENTION

It is known to use isostatic pressure techniques to diffusion bond metal components together. Diffusion bonding occurs when two mating surfaces are pressed together under temperature, time and pressure conditions that allow interchange of atoms across the interface. It is necessary that the surfaces to be joined are clean and that the variables of temperature, pressure and time are closely controlled, so that the necessary interchange of atoms may be achieved. Isostatic pressing is the application of high pressure gas (e.g. argon) at high temperature within a pressure vessel to the components to be joined. Gas pressure is applied isostatically so that there are minimal or no changes to the geometry of the components being joined. This diffusion bonding process requires the efficient sealing of the components, and conventionally, this has been accomplished outside the pressure vessel in a preliminary step. However, the seal between the components after this preliminary step is fragile, and great care has to be taken in moving the joined components to the apparatus where the diffusion bonding process is to be carried out.

Further, as it relates to parts for the impact protection of jet engine fan blades, such parts are exposed to potential impacts from birds and other foreign objects specifically during take-off where the parts are under the most severe stress while at the same time being the most susceptible to impacts. Conventionally, the parts were constructed as one-piece. However, the one-piece part is costly to manufacture. Two-piece parts having a welded joint and/or a bonded joint via a conventional diffusion bonding process could not withstand the impacts associated with the use of the parts. The raw material required to make a one-piece part is costly and is double the cost of a two-piece part. This along with the amount of machining required to generate the internal and external surfaces is tremendous. Most of the machining time required is to produce the internal surfaces and specifically an internal nose radii due to the depth of cut and the small size of the internal nose radii and therefore the need to use small cutting tools.

The present disclosure provides a process of diffusion bonding which overcomes certain difficulties with the prior art methods while providing better and more advantageous overall results.

SUMMARY OF THE INVENTION

In accordance with one non-limiting aspect of the present disclosure, a method of bonding a part for use in jet engine fan blade protection is provided. Although the invention is particularly directed to diffusion bonding of one or more aircraft engine parts and will be described with particular reference thereto, it will be appreciated the diffusion bonding process can be used to bond materials together to form parts for other types of devices (e.g., automotive parts, military components, spacecraft components, etc.). The part for use in a jet engine fan blade includes a first component and a second component diffusion bonded to the first component. The first component is configured as a pressure side component and includes a first primary bond land surface. The second component is configured as a suction side component and includes a second mating bond land surface. A mandrel is provided. The mandrel includes a first surface having a contour that mates with at least a portion of the first component and a second surface having a contour that mates with at least a portion of the second component. The first and second components are positioned on the mandrel so that the first bond land surface and the second bond land surface are in mating abutment. The first component is releasably connected to the second component. The connected first and second components together with the mandrel are positioned in a die assembly. The die assembly including a first die, a second die and a plurality of fastening members for releasably securing the first die to the second die. The first and second dies are formed of a first material having a first coefficient of thermal expansion. The fastening members are formed of a second material having a second smaller coefficient of thermal expansion. The die assembly is placed in a vacuum furnace or other type of heating arrangement for a diffusion bonding cycle. The heating arrangement is evacuated. For example, the heating arrangement is first purged with argon gas to displace any atmospheric contamination and then the heating arrangement is evacuated to a predetermined vacuum level. The temperature of the heating arrangement is increased to a predetermined temperature. Uniform pressure is applied across an interface between the first and second bond land surfaces of the first and second components. The vacuum level, temperature and pressure is maintained within the furnace for a predetermined period of time. The die assembly including the diffusion bonded first and second components is removed from the furnace.

In accordance with another non-limiting aspect of the present disclosure, a diffusion bonding die assembly for diffusion bonding a first component having a nonplanar first bond land surface to a second component having a nonplanar second bond land surface is provided. The diffusion bonding die assembly comprises a mandrel, an upper die and a lower die. The mandrel is configured to releasably hold the first and second components. The first bond land surface and the second bond land surface are in mating abutment when loaded on the mandrel. The upper die includes an upper surface and a lower surface. The lower surface includes a first portion configured to engage the mandrel and a second portion configured to mate with one of the first and second components. The lower die includes an upper surface and a lower surface. The upper surface includes a first portion configured to engage the mandrel and a second portion configured to mate with one of the first and second components. A flexible pressure container is at least partially disposed between one of the upper and lower dies and one of the first and second bond land surfaces of the first and second components. A plurality of fastening members secures the upper die to the lower die and holds the diffusion bonding die assembly together during a diffusion bonding cycle. The plurality of fasteners is configured to limit expansion of the upper and lower dies during the diffusion bonding cycle.

In accordance with yet another non-limiting aspect of the present disclosure, a method of diffusion bonding comprises providing a first component and a second component. The first component includes a first bond land surface having a wave-like conformation. The second component includes a second bond land surface having a wave-like conformation. The mating first and second bond land surfaces to be diffusion bonded are prepared to a predetermined condition such that diffusion bonding across an interface between the surfaces is possible. The first component and the second component are connected so that the first and second bond land surfaces are in mating abutment. A diffusion bonding die assembly configured to releasably secure the connected components therein is provided. The die assembly includes a first die, a second die and a plurality of fastening members for releasably securing the first die to the second die. The die assembly is coated with a release agent along with specifically identified critical areas of the first and second components. The first and second components with the first and second bond land surfaces in mating abutment are placed in the die assembly. The die assembly is placed in a vacuum furnace or other type of heating arrangement for a diffusion bonding cycle. The heating arrangement is evacuated and the temperature of the heating arrangement is increased to a first temperature. The first temperature is maintained for a predetermined period of time. The temperature of the heating arrangement is increased to a second temperature, which is maintained for a predetermined period of time. A first pressure is applied at the second temperature across the interface of the first and second components for a predetermined period of time. The applied pressure is increased to a second pressure. The second pressure is applied at the second temperature across the interface of the first and second components for a predetermined period of time. The applied pressure is decreased to a third pressure. The third pressure is applied at the second temperature across the interface of the first and second components for a predetermined period of time. The temperature of the heating arrangement is decreased to a third temperature. The die assembly including the diffusion bonded first and second components is removed from the heating arrangement.

In accordance with yet another non-limiting aspect of the present disclosure, a part formed by diffusion bonding comprises a first component and a second component. The first component includes a first, bond land surface, a second surface offset from the first surface via a connecting, arcuate wall, and a third surface opposite the first and second surfaces. The second component includes a first surface and a second surface. A section of the second surface forms a second, bond land surface which is bonded to the first, bond land surface of the first component.

These and other aspects of the present invention will become readily apparent upon further review of the following specification and drawings.

BRIEF DESCRIPTION OF THE DRAWINGS

Reference may now be made to the drawings which illustrate various preferred embodiments that the invention may take in physical form and in certain parts and arrangement of parts wherein:

FIG. 3 is a top perspective view of the first component of FIG. 2.

FIG. 4 is a cross-sectional view of the first component of FIG. 2 taken generally along lines 4-4 of FIG. 2.

FIG. 5 is a partially enlarged view of FIG. 4.

FIG. 6 is a side elevational view of the second component of the part of FIG. 1.

FIG. 7 is a cross-sectional view of the second component of FIG. 6 taken generally along lines 7-7 of FIG. 6.

FIG. 8 is a side elevational view of the first component of the part of FIG. 1 illustrating a non-limiting bond land surface.

FIG. 9 is a side elevational view of the second component of the part of FIG. 1 illustrating a non-limiting bond land surface.

FIG. 10 is a front perspective view of a mandrel having the first and second components positioned thereon.

FIG. 11 is a partially enlarged view of FIG. 10.

FIG. 20 is a side perspective view of the part of FIG. 1.

FIG. 21 is a cross-sectional view of the part of FIG. 20.

FIG. 22 is an enlarged partial view of FIG. 21.

DETAILED DESCRIPTION OF NON-LIMITING EMBODIMENT

It should, of course, be understood that the description and drawings herein are merely illustrative and that various modifications and changes can be made in the structures disclosed without departing from the present disclosure. It will also be appreciated that the various identified components for the diffusion bonding process disclosed herein are merely terms of art and should not be deemed to limit the present disclosure.

Further, it should be appreciated that the component materials disclosed herein are by way of example only. The component materials can further include not only elementary metals but metal alloys per se and alloys of metals with ceramic material. The materials may be in the form of sintered powder, a casting, sheet, plate or a forging.

Figure 1:
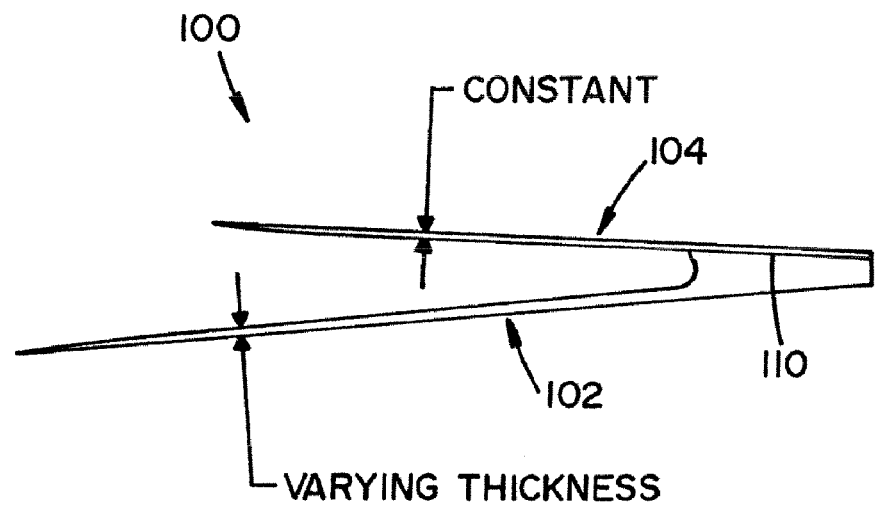
FIG. 1 is a side elevational view of a non-limiting part including a first component and a second component bonded to the first component in accordance to the diffusion bonding process of the present disclosure.
Figure 2:
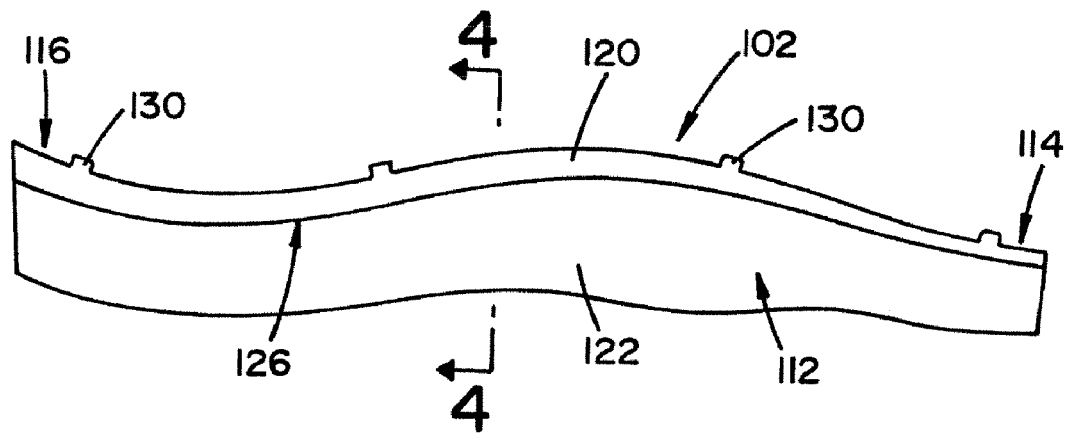
FIG. 2 is a side elevational view of the first component of the part of FIG. 1.

Referring now to the drawings, wherein like numerals refer to like parts throughout the several views, FIG. 1 illustrates a non-limiting example of a part 100 to be manufactured via a diffusion bonding process according to the present disclosure. The example should not be construed as limiting as the example is useful in understanding and practicing the diffusion bonding process described herein.

A general overview of the diffusion bonding process is first provided. The part 100 is manufactured in two separate components, to wit, a first, pressure side component 102 that is bonded to a second, suction side component 104 at a bond joint 110. As can be appreciated, part 100 can be formed of more than two components; however, this is not required. The first component 102 can be manufactured from AMS 4911 plate stock (approximately 0.375 in. thick) that is rough machined, hot formed and then machine finished in preparation for diffusion bonding. The second component 104 can be manufactured from AMS 4911 sheet stock (approximately 0.040 in. thick) that is machine finished as a flat pattern and then hot formed. As can be appreciated, one or both of the components can be formed of different materials and/or have different thicknesses.

As is well known, AMS 4911 is a titanium alloy which is heat treatable and combines excellent strength and corrosion resistance. AMS 4911 is widely used in the aircraft industry in a variety of turbine (i.e., turbine discs) and "hot" structural applications. It is generally employed in applications up to 750° F. (400° C.).

Figure 13:
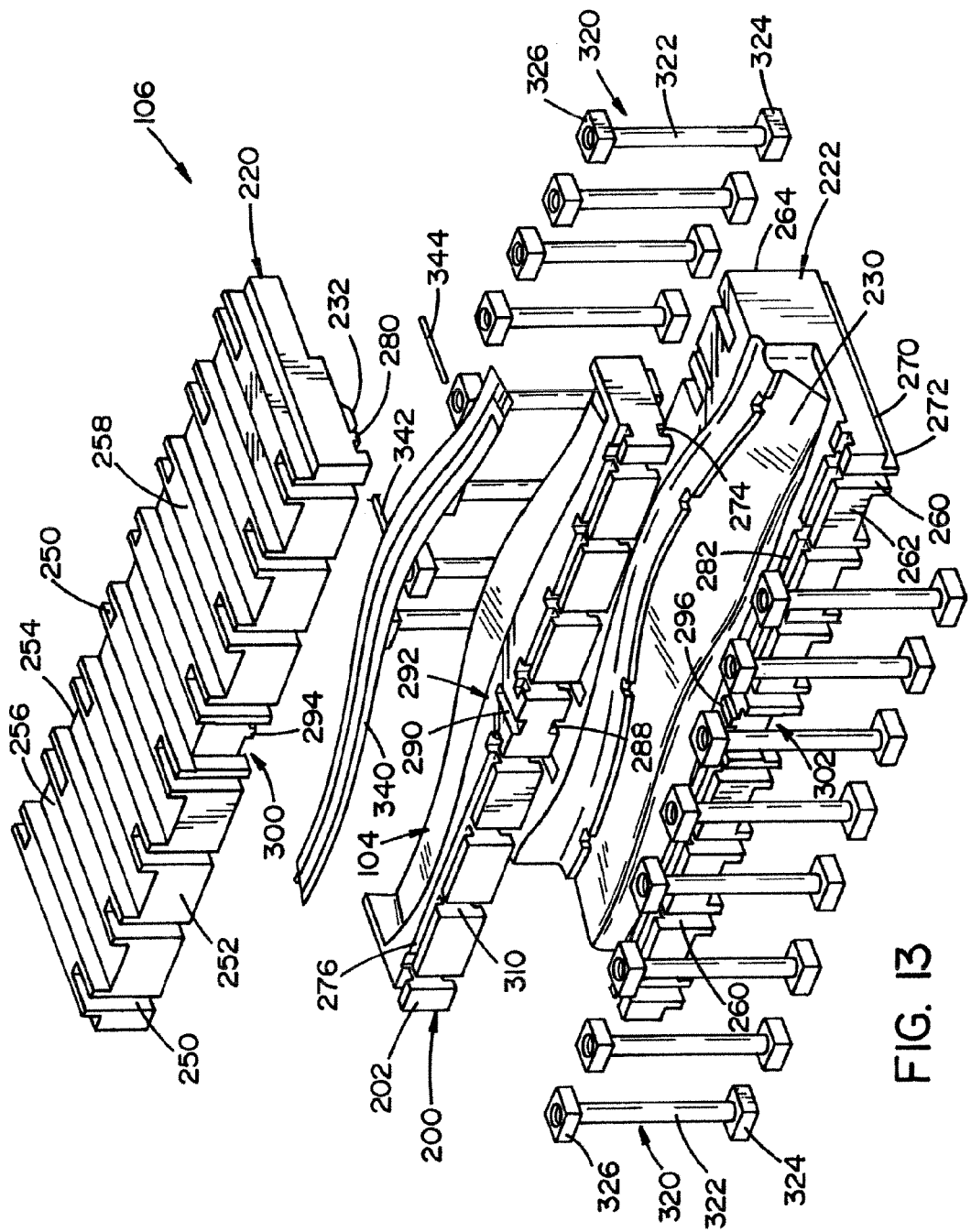
FIG. 13 is an exploded front perspective view of a non-limiting diffusion bonding die assembly for forming the part of FIG. 1 including a first die, a second die, a pressure bag, and the mandrel and first and second components of FIG. 10.
Figure 14:
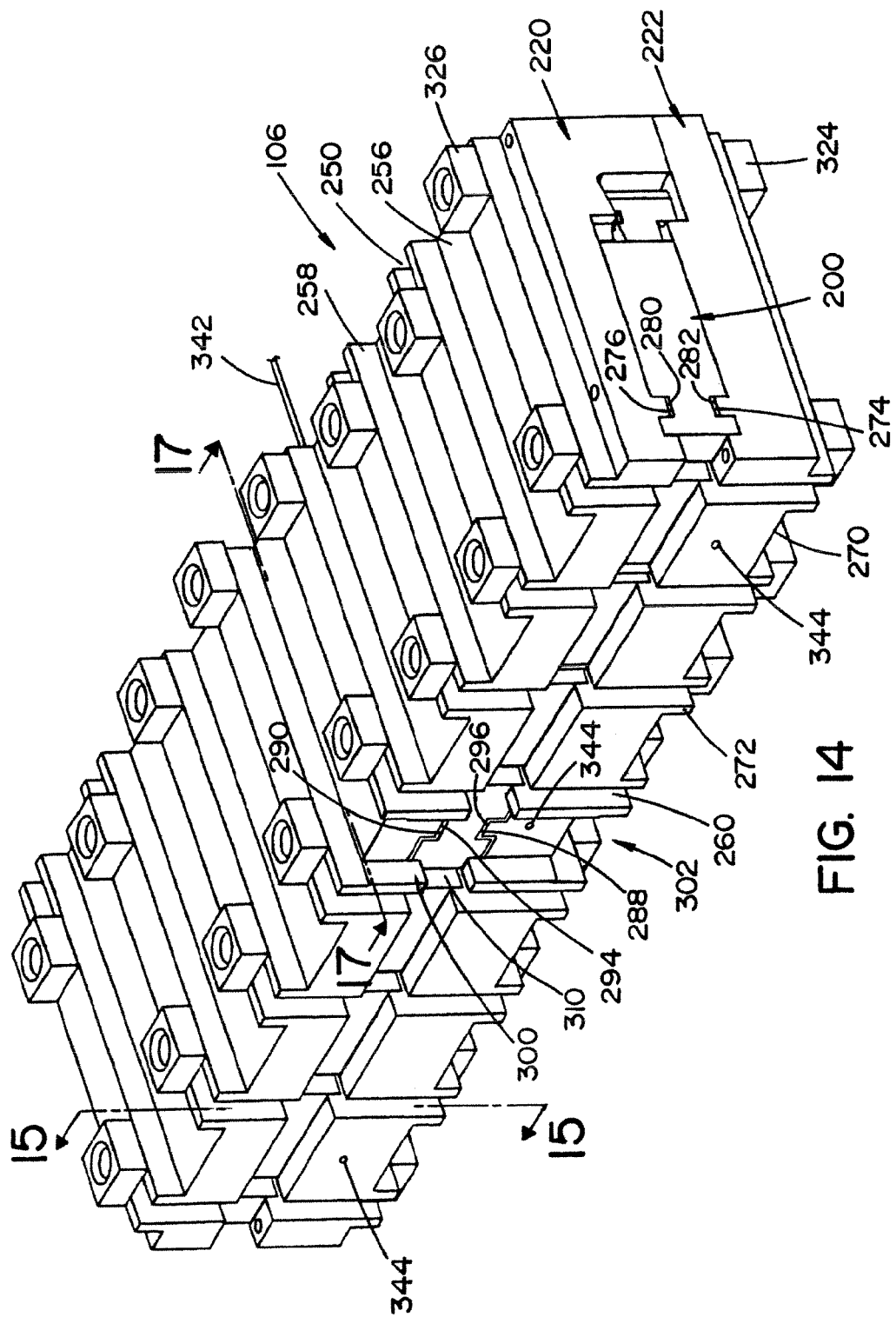
FIG. 14 is a front perspective view of the diffusion bonding die assembly of FIG. 13 is an assembled condition.

In preparation for the diffusion bonding process, the two components 102, 104 are typically cleaned (e.g., remove residue, smut, water breaks, etc.), connected together (e.g., tack welded at tabs, clamping, etc.) and then loaded into a diffusion bonding die assembly 106 according to the present disclosure (FIGS. 13 and 14). When the components are connected together by tack welding, the tack welding can occur in an argon atmosphere; however, this is not required. Tack welding the components together typically occurs in multiple locations (e.g., four tack weld locations, etc.); however, this is not required. The two components are typically inspected prior to bonding to verify the quality and integrity of the two components; however, this is not required. For instance, the surface roughness of the two parts can be measured; however, this is not required. The die assembly is also typically inspected to verify that the die assembly is clean (e.g., free of oil, grease, cutting fluid residue, etc.) prior to bonding the two components; however, this is not required. The die assembly can be placed in a furnace at a certain temperature (e.g., 1800° F., etc.) and for a period of time (e.g., 1 hour, etc.) to clean the die assembly; however, this is not required. If the die assembly is heated to be cleaned, the die assembly is typically cooled to 1000° F. or lower and gas fan quenched; however, this is not required. Once the die assembly components are verified as being dry and clean, the die assembly and die components are typically sprayed with stop-off is regions where no diffusion bond is to be formed; however, this is not required. The diffusion bonding die assembly 106 is then placed in a heating arrangement such as a vacuum furnace and a diffusion bonding cycle is run at preset parameters. After bonding, metallographic samples can be taken and evaluated for bond integrity, locate irregular conditions in the bond, locate microstructure abnormalities and other surface characteristics, identify minimum/maximum bonding characteristics, etc. so as to determine whether to accept or reject the formed parts; however, this is not required. The part 100 can also, or alternatively, be ultrasonically inspected, fluorescent penetrant inspected, CMM inspected, etc.; however, this is not required. Inspection Method Sheet (IMS) may be used to check and/or verify proper inspection of the formed part. The amount of hydrogen in the formed bond can also be tested; however, this is not required. After inspection, the part is typically finished machined and manually dressed to meet predetermined visual requirements. Again, the part 100 is by way of example only. It should be appreciated that parts having alternative materials, shapes and/or sizes can be manufactured via the diffusion bonding process described herein.

The first and second components 102, 104 of the part 100 will now be described in greater detail. With reference to FIGS. 2-5, the first component 102 comprises a first elongated member 112 having a wave-like or ribbon-like conformation. Particularly, as shown in FIG. 3, as the elongated member twists from a first end portion 114 to a second end portion 116, the elongated member curving along two opposed diameters. The elongated member includes a first or primary bond land surface 120, a second surface 122 offset from the bond land surface via a wall 126, and a third surface 128 opposite the first and second surfaces. A plurality of spaced apart tabs 130 can extend from the first surface. As shown in FIG. 4, the first and third surfaces together 120, 128 define a first section 134 of the elongated member and the second and third surfaces together 122, 128 define a second section 136 of the elongated member. The first section 134 increases in thickness as it transitions into the second section 136; however, this is not required. The second section decreases in thickness as it extends at an acute angle from the first section. As noted in FIG. 1, the first component 102 has a varying thickness.

With reference to FIGS. 4 and 5, the wall 126 connects the first surface 120 and the second surface 122. The wall includes an arcuate surface 140 having a first end 142 that connects to the second surface and a second end 144 that connects to a ramp 150. The ramp has a generally triangular shape, an end portion of the ramp being slightly offset from the first surface.

With reference to FIGS. 6 and 7, the second component 104 comprises a second elongated member 160 having a wave-like or ribbon-like conformation, which twists from a first end portion 166 to a second end portion 168. The second elongated member includes a first surface 162 and a second surface 164. A section 170 of the second surface at least partially defines a second mating bond land surface that is bonded to the first, bond land surface 120. Similar to the first elongated member, a plurality of spaced apart tabs 172 can extend from the bonding surface section 170. As noted in FIG. 1, the second component 104 includes a first section 174 having a constant thickness and a second, transitioning section having a decreasing thickness; however, this is not required.

In preparation for the diffusion bonding process, and as indicated above, the first and second components 102, 104 are cleaned and the mating surfaces of the first and second components are prepared to a predetermined smoothness (e.g., a smoothness of about 1 micron or better). The components 102, 104 are then connected and loaded into the diffusion bonding die assembly 106. To facilitate the cleaning and any subsequent inspection, and as shown in FIGS. 8 and 9, the first and second components include at least one hole 180, 182 which allows the first and second components to be hung to avoid contact with foreign surfaces. As can be appreciated, this inclusion of one or more holes in the components is not required.

Figure 12:
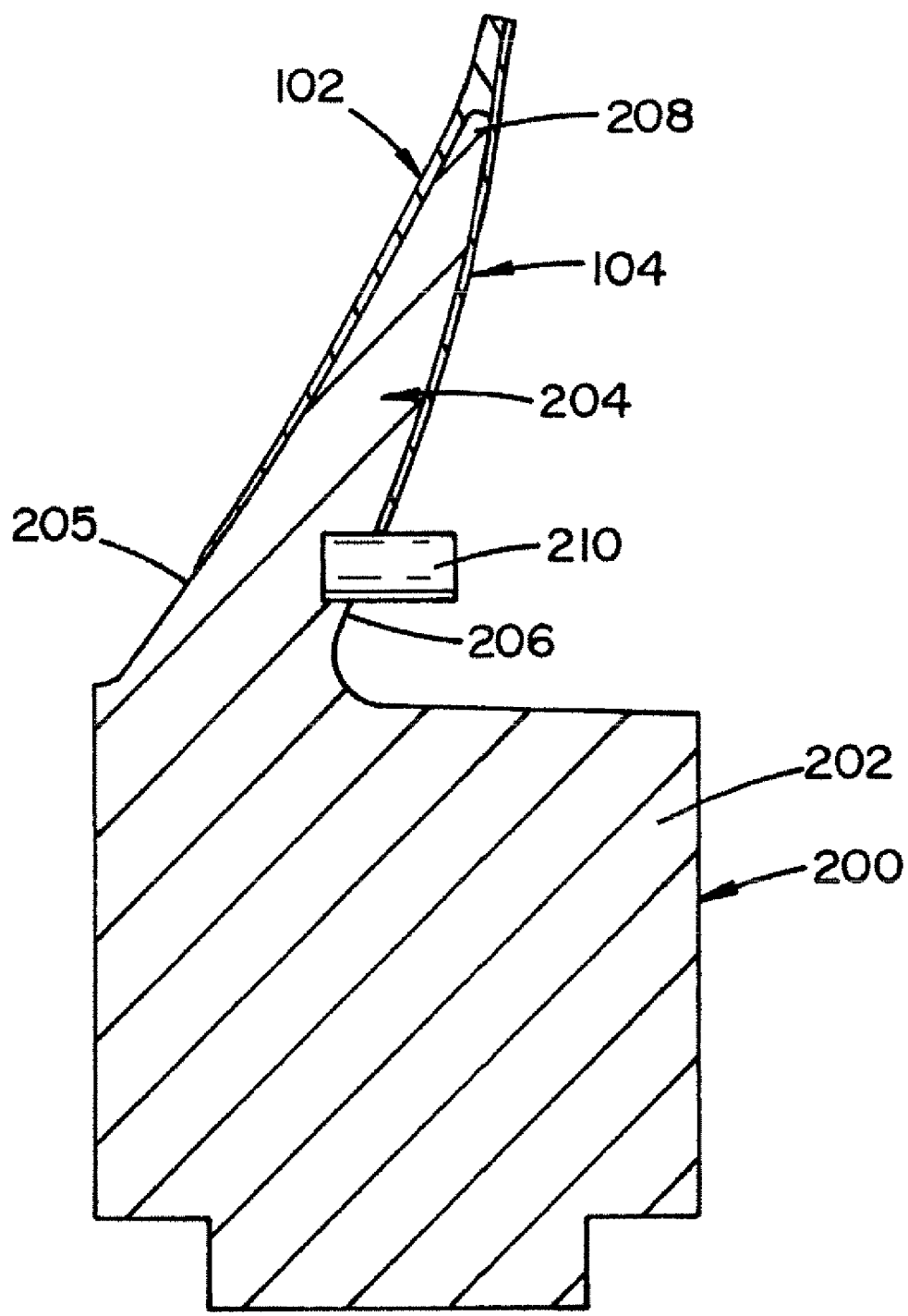
FIG. 12 is a side cross-sectional view of FIG. 10.

With reference to FIGS. 10-12, a mandrel 200 is provided to ensure the proper connecting of the first component 102 to the second component 104. The mandrel includes a base 202 and an arm 204 extending from the base. The arm is generally triangular in shape and includes a first surface 205, a second surface 206 and an arcuate end portion 208. As can be appreciated, the arm 204 can have other shapes. The first and second surfaces have contours which mate with the ribbon-like contours of the respective first and second components 102, 104. The end portion 208 has a contour which mates with the arcuate surface 140 of the wall 126. This allows the first component 102 to be releasably positioned on the mandrel. At least one pin 210 extends outwardly from a lower portion of the second surface 206 of the arm 204. The at least one pin allows the second component to be releasably placed on the mandrel. As shown, two pins are provided; however, a greater or lesser number of pins can be used. The pins are located a predetermined distance from the end portion 208 so that once the second component 104 is positioned on the pins 210, the tabs 172 can be aligned with the tabs 130 (see FIG. 11). Once aligned, the tabs 130, 172 are held together by suitable fastening means, such as, but not limited to, small C-clamps (not shown). The mandrel 200 and clamped first and second components 102, 104 are then placed in an argon chamber (not shown) wherein the tabs 130, 172 can be tack welded together. Although, it should be appreciated that the first and second components can be connected via additional or alternative means. In that instance, the tabs 130, 172 are not required. The mandrel and connected first and second components are then quickly placed in the diffusion bonding die assembly 106 to ensure that the bonding surfaces remain clean.

As shown in FIGS. 13 and 14, the diffusion bonding die assembly 106 comprises a first die 220 and a second die 222. The second die includes a surface 230 having a configuration which can mate with one of the first and second components 102, 104. The first die includes a surface 232 which can conform to the other of the first and second components. For example, the surfaces 230, 232 can have a wave-like or ribbon-like conformation; however, surfaces 230, 232 can have other or additional shapes. In the depicted embodiment, surface 230 protrudes at least partially from the second die and engages the second component 104. Surface 232 protrudes at least partially from the first die and engages the first component 102. The first die 220 includes a plurality of spaced apart cutouts 250 located on opposed sides 252, 254 of the die. A wall 256 of the first die includes a plurality of spaced apart shelves 258 which extend outwardly from the wall 256. The cutouts 250 extend through the shelves 258. Similarly, the second die 222 includes a plurality of spaced apart cutouts 260 located on opposed sides 262, 264 of the die. A wall 270 of the second die 222 includes a plurality of spaced apart shelves 272 which extend outwardly from the wall 270. The cutouts 260 extend through the shelves 272. In an assembled position (FIG. 14), the wall 256 is parallel to the wall 270; however, this is not required. The first and second dies 220, 222 can be formed of a HH2 casting, which is a 309 stainless steel that has a high carbon content; however, other materials can be used.

Figure 15:
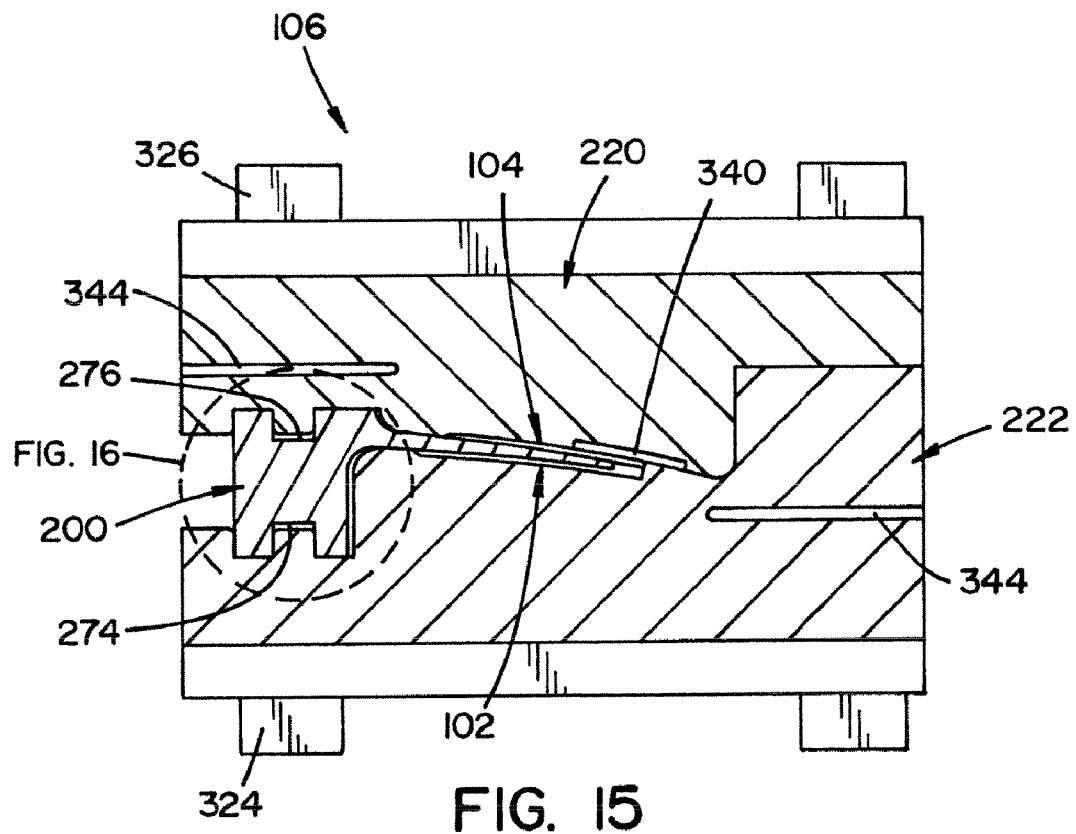
FIG. 15 is a cross-sectional view of the diffusion bonding die assembly of FIG. 13 taken generally along lines 15-15 of FIG. 13.
Figure 16:
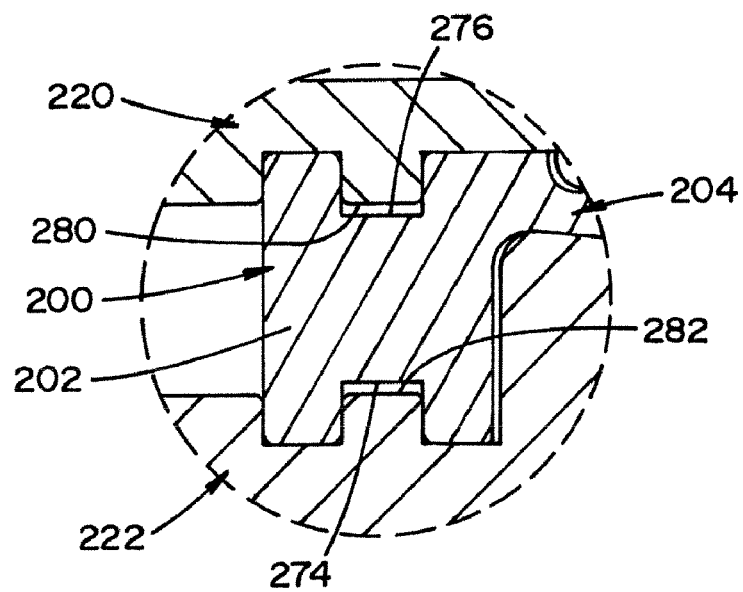
FIG. 16 is a partially enlarged view of FIG. 15.
Figure 17:
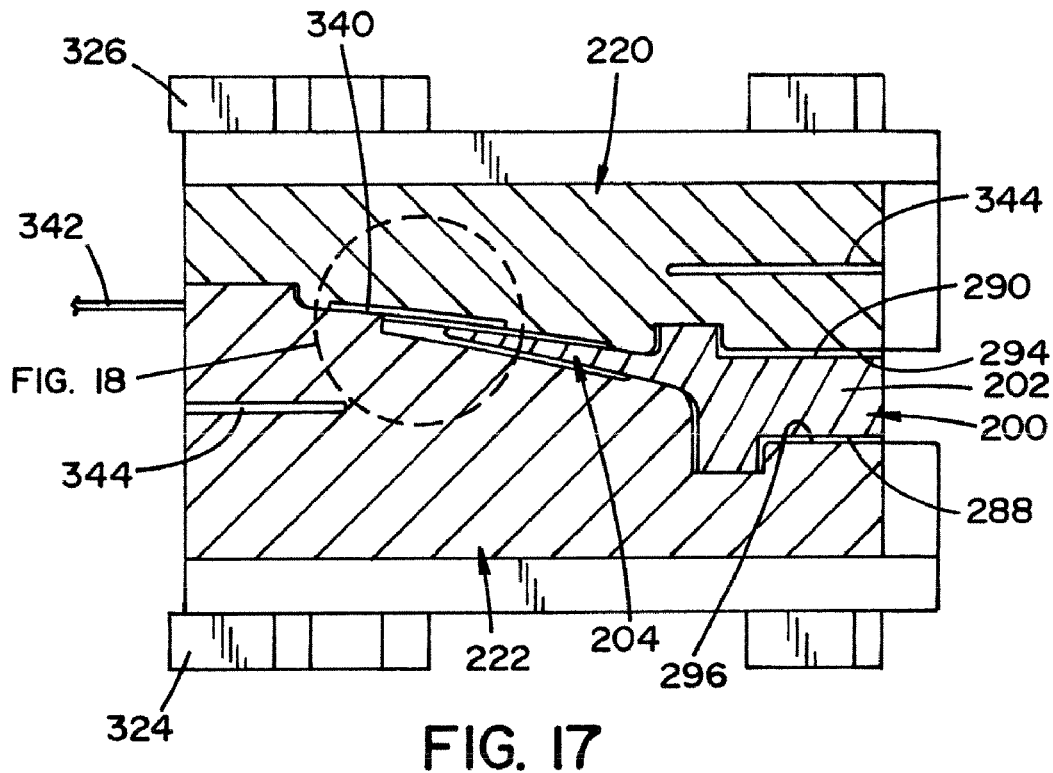
FIG. 17 is a cross-sectional view of the diffusion bonding die assembly of FIG. 13 taken generally along lines 17-17 of FIG. 13.
Figure 18:
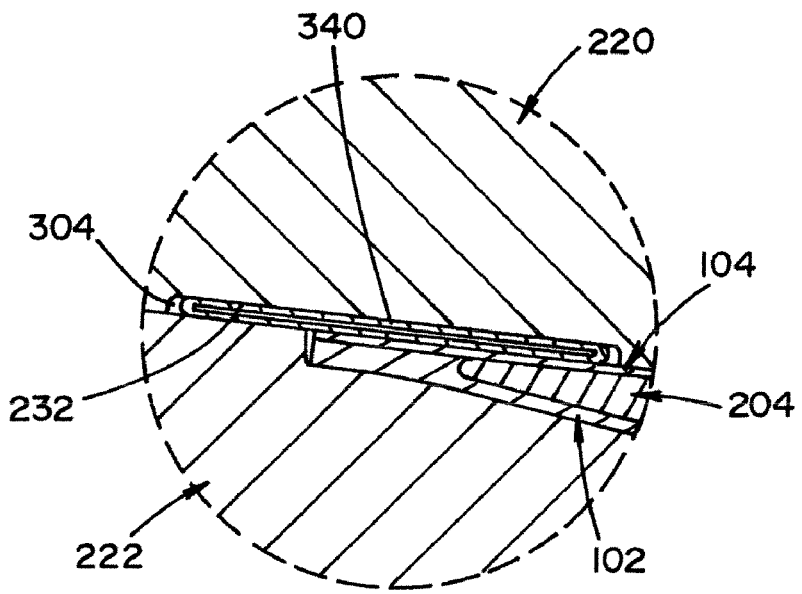
FIG. 18 is a partially enlarged view of FIG. 17.

As shown in FIGS. 15 and 16, in an assembled position, the mandrel 200 is securely positioned between the first and second dies 220, 222. Particularly, the mandrel 200 includes first and second opposed grooves 274 and 276, respectively. Each groove extends the length of the mandrel base 202; although, this is not required. The first and second grooves 274, 276 are configured to receive first and second projections 280, 282 located on the respective first and second dies 220, 222. Spacing is provided between portions of the base 202 and the first and second dies. As shown in FIGS. 17 and 18, the mandrel 200 further includes first and second recesses 288, 290, respectively. The recesses are located in an offset region 292 of the mandrel base and are generally normal to the first and second grooves 274, 276. The first and second recesses 288, 290 are configured to receive first and second tabs 294, 296 located on the respective first and second dies 220, 222. Each tab extends inwardly from a respective offset region 300, 302 of each die 220, 222. Further, the surface 232 of the first die 220 includes an offset portion 304. At least a portion of the pressure bag 340 is disposed in the offset portion for bond transition.

With reference again to FIG. 14, in the assembled position, the cutouts 250 are aligned with the cutouts 260 and corresponding cutouts 310 located on the base 202 of the mandrel 200. The cutouts are dimensioned to receive fastening member or pins 320. As shown, each pin can be generally dumbbell-shaped; although, this is not required. The pin includes and a shaft 322 and caps 324, 326 located on ends of the shaft. The shaft is cylindrically shaped and the caps are rectangularly shaped; although, this is not required. As shown, sixteen pins are provided, eight for each side of each first and second die 220, 222. Although, it should be appreciated that more or less than sixteen pins can be used to secure the diffusion bonding die assembly 106. Each pin can be stamped with its own unique number and correlates with a cutout location stamped on the die assembly 106. Additionally, the pins can be marked with a letter of the alphabet that associates them with a specific die. Each pin has a predetermined length, the length of the pin being dependent on it location on the die.

The pins can be formed from a Haynes 230 alloy; however, other materials can be used. As is well known, Haynes 230 alloy is a nickel-chromium-tungsten-molybdenum alloy that combines excellent high temperature strength, outstanding resistance to oxidizing environments up to 2100° F. (1149° C.) for prolonged exposures, premier resistance to nitriding environments, and excellent long-term thermal stability. It is readily fabricated and formed, and is castable. Other attractive features include lower thermal expansion characteristics than most high-temperature alloys, and a pronounced resistance to grain coarsening with prolonged exposure to high-temperatures.

As illustrated in FIG. 13, a pressure container or bag 340 is positioned between one of the first and second dies 220, 222 and one of the first and second components 102, 104 positioned on the mandrel 200 for applying a uniform pressure between the one of the first and second dies and one of the first and second components during the diffusion bonding process. The pressure bag is made of a flexible sheet of material, such as, but not limited to, a sheet of 309 stainless steel, so that the pressure bag can conform to the shape of one of the first and second components located on the mandrel 200. This is desirable because the twisting, ribbon-like shape of each part component 102, 104 makes it difficult for the first and second components to be simply pressed in a conventional die.

In the depicted embodiment of FIG. 13, the pressure bag is disposed between the surface 232 of the first die 220 and the second component 104 located on the mandrel 200. One of the first die and the mandrel can include means for proper positioning of the pressure bag thereon. For example, the first die can include locating pins (not shown) which engage corresponding holes (not shown) located on the pressure bag. The pressure bag 340 defines a chamber (not shown) for receiving a gas from a remote source via a gas line 342 connected to the pressure bag. In this embodiment, compressed argon gas is released from a storage tank at approximately 200 PSI to approximately 250 PSI; although, alternative gases and pressures are contemplated. The argon gas flows through a hose and into the pressure bag line 342. The line can be regulated by a digital pressure gage (not shown) that can be monitored by the operator. The argon gas dew point can be periodically monitored (e.g., monthly, etc.) to determine that moisture content generally does not to exceed about −76° F.

As it relates to the complementary materials for the first and second dies 220, 222 and the pins 320, the HH2 material compared to the Haynes 230 alloy provides a small but significant difference in the coefficients of thermal expansion between the two materials. It should be appreciated by one skilled in the art that alternative complementary metal or metal alloys are contemplated so long as differing coefficients of thermal expansion exists between the alternative materials. As is well known, coefficients of thermal expansion of a material are complicated and can vary dramatically as the actual temperature varies, but defines the relationship of the change in size of a material as the temperature of the material changes. A coefficient of thermal expansion is the fractional increase in length per unit rise in temperature. It can be defined at a precise temperature or over a temperature range. Thermal expansion is an important consideration in design, and is often overlooked. As will be appreciated by one skilled in the art, the coefficient of thermal expansion for the HH2 material is slightly higher than that of Haynes 230 alloy. Thus, the first and second dies 220, 222 will expand slightly more than the pins 320 upon exposure to a temperature exceeding the annealing temperatures of both materials. In use, as the temperature in the furnace increases, the first and second dies 220, 222 will start to expand. This expansion will be limited by the pins 320, which are expanding at a slower rate. Additionally, because the pins 320 can have differing lengths, the length of the pins can further limit the expansion of the first and second dies. The difference in expansion between the first and second dies and pins transfers pressure to the pressure bag 340, which, in turn, provides a uniform load to the bond land surfaces 120, 170 of the first and second components 102, 104. Further, the increase of temperature in the furnace will increase the pressure within the pressure bag 340, which, in turn, increases the pressure between the first and second dies 220, 222 and the first and second components 102, 104.

Non-expandable thermocouples 344 can be located in at least one of the first and second dies 220, 222 for monitoring temperature. The thermocouples are generally used for up to thirty bond cycles and can be calibrated to special limits. Usage of the thermocouples can be controlled by system accuracy tests performed at about 1500° F. to a maximum deviation of ±4° F. (±0.4%) to maximum ±5° F. or up to the thirty bond cycles, whichever occurs first.

With reference to FIGS. 20-21, the part 100, after the diffusion bonding process and the connected tabs 130 and 172 are carefully removed from the part, includes a bond area 370. The bond area can be ultrasonically inspected to ensure proper connection between the bond land surface 120 of first component 102 and the section 170 of the second surface 164 of second component 104. The external surfaces of the part can then be cleaned and finished.

Figure 23:
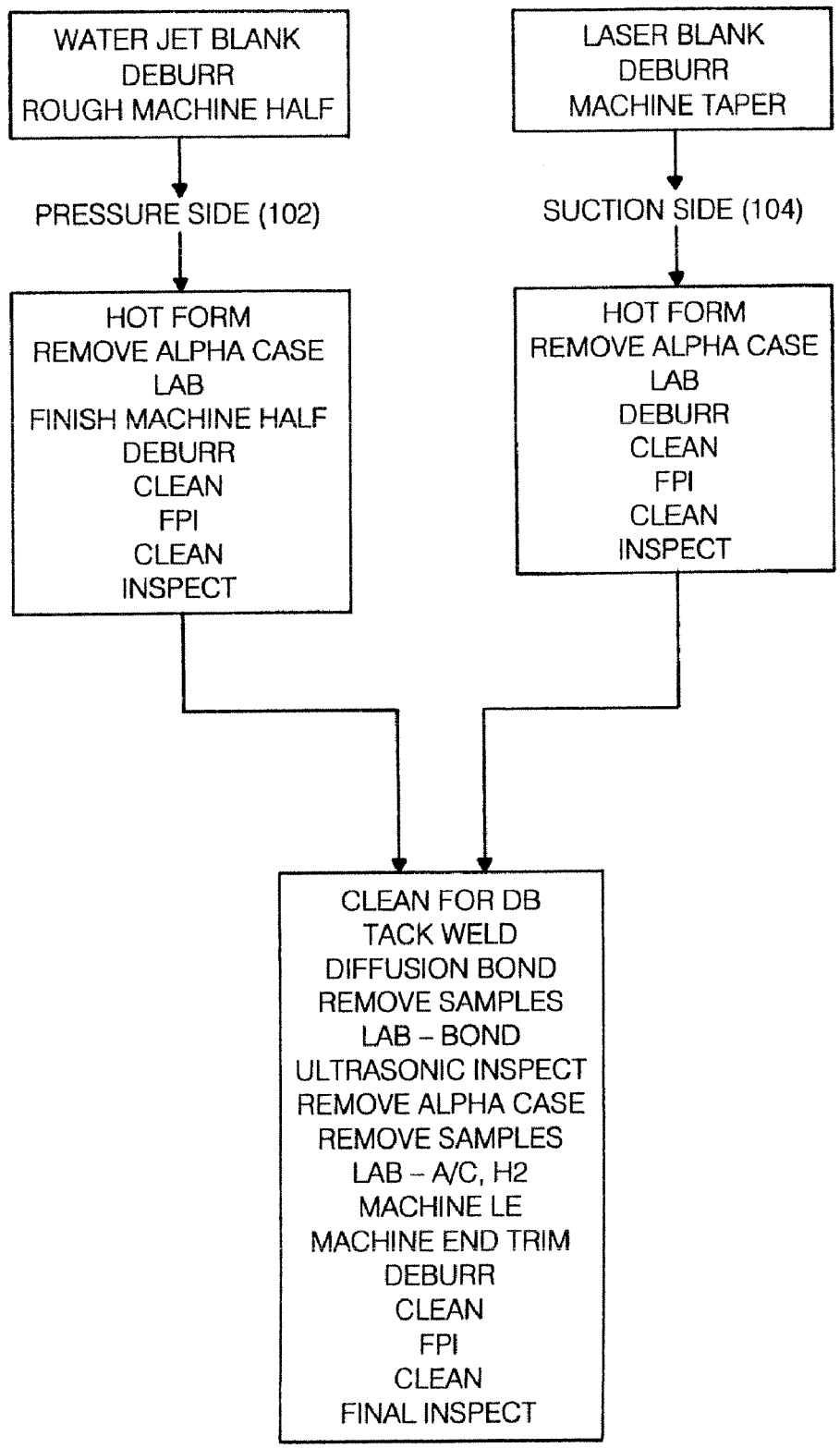
FIG. 23 is a chart summary of a non-limiting diffusion bonding process according to the present disclosure.

With reference to FIG. 23, a summary of the diffusion bonding process according to the present disclosure is provided. As indicated previously, the first component 102 can be manufactured from AMS 4911 plate stock (approximately 0.375 in. thick) that is rough machined, hot formed and then machine finished in preparation for diffusion bonding. The second component 104 can be manufactured from AMS 4911 sheet stock (e.g., 0.040 in. thick) that is machine finished as a flat pattern and then hot formed.

In preparation for the diffusion bonding process, the two components 102, 104 are cleaned, connected together and loaded into the diffusion bonding die assembly 106. In order to chemically clean the first and second components, the halves can be placed on cleaning racks made of 316 stainless steel. Up to four separate processing tanks can be utilized for the cleaning, namely, an alkaline cleaner tank, a chemical clean etch tank, a city rinse tank and/or a deionize rinse tank. The parameters of each of the tanks are provided below. The maximum time between cleaning and diffusion bonding is generally eight (8) hours or less.

| ALKALINE CLEANER TANK | CHEM-CLEAN ETCH TANK | CITY RINSE TANK | DEIONIZE RINSE TANK |
| --- | --- | --- | --- |
| Solution Components at start up: Water = 48" = 745 gals 8-10 oz./gal Turco Vitro-Kleene = 500 lbs (1 1/4 drum) Operating Conditions - Temperature - 160° F.-200° F.; Air Agitation Frequency Analysis - Once per week Spec limit - Vitro-Kleene 7-12 oz/gal Target limits - Vitro-Kleene 8-10 oz/gal | Solution Components at start up: 35 +/− 5% Nitric ($HNO_3$) = 17.8" = 278 gals 3 +/− 1% Hydrofluoric (HF) = 1.5" = 24 gals Remainder Water = 31.6" = 493 gals Operating Conditions - Temperature - RT to 120° F. max; Air Agitation Frequency Analysis - Twice weekly Spec limit- $HNO_3$(30-40%); *HF (6% Max); Etch rate .0015-.005 I/S/H Target limits - $HNO_3$(31-39%); Etch rate .0019-.0046 I/S/H | Solution Components - 100% City Water Operating Conditions - Temperature - As received in city line; Agitation - Air or Spray rinse when activated; No contaminants - such as rust particles if overflow tank Control limits - Chlorine content - 2.0 ppm max.; Total Dissolved Solids (TDS) - 750 ppm max.; Chlorides - 30 ppm max | Solution Components - 100% Deionized water Operating Conditions - Temperature - As received in city line through DI unit; Agitation - Spray when activated Control limits - Conductivity - <10 umhos (which = 6 ppm NaCl); Total Dissolved Solids (TDS) -10 ppm max |

Figure 19:
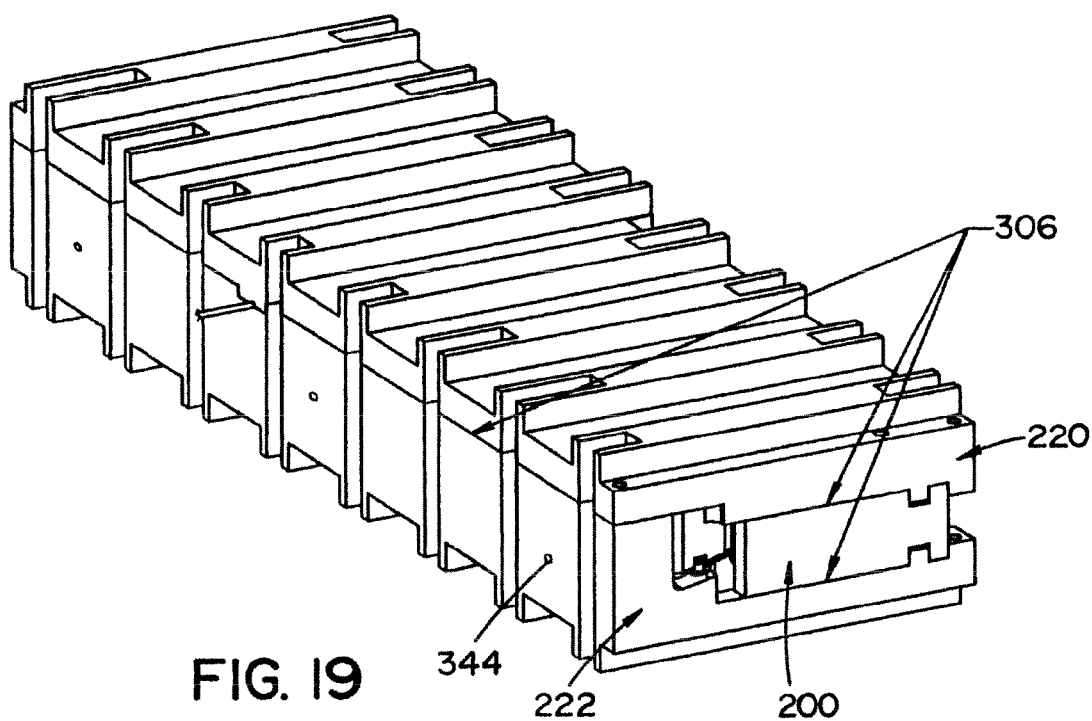
FIG. 19 is a front perspective view of the first and second dies and the mandrel in a post diffusion bonding inspection condition.

*Note:
Acid tanks - shall be controlled by etch rate. Process may continue if etch rate is within limits and HF is below minimum limit The first and second dies 220, 222 are inspected to ensure die flatness and parallelism. The length of each pin 320 is typically measured for accuracy. The contours of each die 220, 222 and the mandrel 200 can be inspected after every $10^{th}$ bond cycle; however, inspections can occur after more or less numbers of bond cycles. The second die can be divided into multiple sections (e.g. 3, 4, 5, 6 sections, etc.) and compared to certain die parameters. Data regarding the die can be collected and stored electronically to be monitored. This data collection can serve as a trouble shooting tool relative to part quality. The pressure bag 340 can be pressure tested prior to every bond cycle to confirm that the pressure bag will hold pressure (e.g., 50 psi with argon gas) and that there are no leaks. With reference to FIG. 19, the diffusion bonding die assembly 106 and mandrel can be inspected after one or more cycles. Particularly, the first and second dies 220, 222 and the mandrel 200 are generally assembled without the pressure bag 340 to verify that a gap 306 surrounding the first and second dies and mandrel does not exceed a maximum gap of approximately 0.010 inches.

The furnace is also periodically checked. For example, furnace burn outs can be performed weekly at about 2000° F. for one hour. Furnace leak rates meeting less than or equal to about 3 microns or less per hour are performed weekly. Furnace temperature uniformity surveys to about ±15° F. are performed quarterly. System accuracy tests are performed monthly to about 0.5% to maximum about ±5° F. (this includes control thermocouples and load thermocouples). Instrumentation calibrations are performed quarterly to about ±2° F. readable within about 1° F.

Prior to diffusion bonding, the following items generally are verified: 1) that a scheduled burnout has been performed; 2) that the scheduled leak rate has been performed and is less than or equal to a predetermined amount per hour; 3) that there is sufficient gas for delivery to the pressure bag 340 during a bond cycle; and 4) that the first and second dies 220, 222 are clean and free of any oils/grease/cutting fluid residue, etc. If the diffusion bonding die assembly 106 is not clean, the diffusion bonding die should be burned out at about 1800° F. for about 1 hour, furnace cool to about 1000° F. maximum and gas fan quench; 5) that the first and second dies 220, 222 and mandrel 200 and pressure bag 340 are clean from any previous bond cycle (i.e., have been scotch-brited smooth), with no remaining solids, residue or raised material on the surfaces. The surfaces must be dry.

To assemble the diffusion bonding die assembly 106 for a diffusion bonding cycle, the operator should wear clean lint free gloves. The mandrel 200, first and second dies 220, 222 and the pressure bag 340 can be coated with a release agent, such as a boron nitride spray. Specifically identified critical areas of the first and second components are also coated with the release agent. The release agent is typically used when diffusion bonding titanium components. The part 100 is loaded onto the mandrel 200 and the mandrel is placed on the second die 222 as described above making sure that the connected tabs 130, 172 of the part 100 are seated properly into the second die. The pressure bag 340 is placed at least partially over the part and secured on the first die. The pins 320 are then secured to the diffusion bonding die assembly 106, noting that the pins can be numbered and correlated with a numbered position on the first die 220. The pressure bag 340 is inflated with gas and held to verify that the pressure bag maintains adequate pressure. The diffusion bonding die assembly 106 including mandrel 200 and part 100 are then loaded into a vacuum furnace in a predetermined orientation (i.e., 45° front right to back left). The gas pressure valves are left open to prevent pressure build up in the pressure bag until soak point. The furnace's pyrometry system is controlled per set requirements. The furnace is first purged with argon gas to displace any atmospheric contamination and then the furnace is evacuated to a predetermined vacuum level. Multiple bonding dies may be run in one furnace load depending on the size of the vacuum furnace being used.

The diffusion bonding cycle of the present disclosure is typically run to the following preset parameters; although, it should be appreciated that the exemplary parameters can vary.

---

FURNACE LOAD
EQUIPMENT: VACUUM BONDING PRESS
MAT'L SPEC: AMS 4911                                        MAX. STK. THK.: 0.300" (Ref Only)
APPROX. PART SIZE: 6" × 42"                         (Die Size 10" × 1' × 3.5')
ATMOSPHERE (DURING RAMP): $5 \times 10^{-4}$ Torr Max.
ATMOSPHERE (DURING SAOK): $5 \times 10^{-4}$ Torr Max.
Controller Set Point May Be Set Within 10 Deg. F. Higher Or Lower Than The Soak Temps To Bring The TC Spread Within The Evenly Distributed ± Range.
Pump Furnace Down To ≦3 microns Then Backfill With Argon And Turn On Fan Twice At Start Of Cycle
$1^{st}$ Ramp Rate: 20 F./Min Max.
$1^{st}$ Soak Temp: 1500 ± 50 Deg. F.
$1^{st}$ Soak Time: Equalize TC's to ±20
As Cycle Temp Increases Verify That There Is No Pressure In The Pressure Bag
$2^{nd}$ Ramp Rate: 5 F./Min. Max.
$2^{nd}$ Soak Temp: 1700 ± 15 Deg. F.
$2^{nd}$ Soak Time: Hold 150-170 Minutes
Once load reaches soak temp pressurize to 100 ± 10 psi for 50-60 minutes, increase to 200 ± 10 psi for next 50-60 minutes, then decrease to 150 ± 10 psi for remaining cycle. Release pressure after end of cycle.
$3^{rd}$ Ramp Rate: Furnace Cool
$3^{rd}$ Soak Temp: 1200 Deg. F.
$3^{rd}$ Soak Time: N/A
$4^{th}$ Ramp Rate: N/A
$4^{th}$ Soak Temp: N/A
$4^{th}$ Soak Time: N/A
GAS FAN COOL USING ARGON ATMOSPHERE TO A MAX. TEMP. OF 300 DEG. F.

---

FURNACE LOAD
EQUIPMENT: VACUUM BONDING PRESS
MAT'L SPEC: AMS 4911                                        MAX. STK. THK.: 0.300" (Ref Only)
APPROX. PART SIZE: 6" × 42"                         (Die Size 10" × 1' × 3.5')
ATMOSPHERE (DURING RAMP): $5 \times 10^{-4}$ Torr Max.
ATMOSPHERE (DURING SAOK): $5 \times 10^{-4}$ Torr Max.
Controller Set Point May Be Set Within 10 Deg. F. Higher Or Lower Than The Soak Temps To Bring The TC Spread Within The Evenly Distributed ± Range.
Pump Furnace Down To ≦3 microns Then Backfill With Argon And Turn On Fan Twice At Start Of Cycle
$1^{st}$ Ramp Rate: 20 F./Min. Max.
$1^{st}$ Soak Temp: 1500 ± 20 Deg. F.
$1^{st}$ Soak Time: Equalize TC's to ±20
As Cycle Temp Increases Verify That There Is No Pressure In The Pressure Bag
$2^{nd}$ Ramp Rate: 5 F./Min. Max.
$2^{nd}$ Soak Temp: 1700 ± 15 Deg. F.

2$^{nd}$ Soak Time: Hold 150-170 Minutes
Once load reaches soak temp pressurize to 100 ± 10 psi for 50-60 minutes, increase to 250 ± 10 psi for next 50-60 minutes, then decrease to 200 ± 10 psi for remaining cycle. Release pressure after end of cycle.
3$^{rd}$ Ramp Rate: Furnace Cool
3$^{rd}$ Soak Temp: 1000 Deg. F.
3$^{rd}$ Soak Time: N/A
4$^{th}$ Ramp Rate: N/A
4$^{th}$ Soak Temp: N/A
4$^{th}$ Soak Time: N/A
GAS FAN COOL USING ARGON ATMOSPHERE TO A MAX. TEMP. OF 300 DEG. F.

After bonding, metallographic samples are taken and evaluated for bond integrity. The part 100 can also be ultrasonically inspected. For example, the bond are 370 can be inspected using a pulse-echo L-wave mode. The bond area is inspected with the ultrasonic beam generally normal to the part surface (e.g. about ±1 degree) and focused at the bond joint. Laboratory testing can be performed directly from samples obtained from excess trim areas of each diffusion bonded part. After ultrasonic inspection, the part is then finished machined, cleaned and manually dressed to meet predetermined visual requirements. Again, the part 100 is by way of example only. It should be appreciated that parts having alternative shapes and sizes can be manufactured via the diffusion bonding process described herein.

As is evident from the foregoing, the diffusion bond die assembly 106 is unique for several reasons. The die can operate at up to about 1720° F. The die material can be cast HH2 which has a slightly higher carbon content than standard cast 309 stainless steel. The mechanical, uniform load that is applied to the bond land at temperature can be produced using a 309 stainless steel pressure bag 340. This allows this type of tool to be run in almost any standard vacuum furnace with only slight modification for plumbing for the pressure bag. The first and second dies 220, 222 can be held together at temperature using pins 320 made of Haynes 230 alloy. This material can be used because it has a slightly lower coefficient of thermal expansion in comparison to HH2 die material. As shown in FIG. 16, this allows the die to be put together loose and then become tight at a temperature when the load is place on the bond land.

It will be appreciated that several of the above-disclosed and other features and methods, or alternatives thereof, may be desirably combined into many other different systems or applications. Also those variations presently unforeseen or unanticipated alternatives, modifications, variations or improvements therein may be subsequently made by those skilled in the art. These are also intended to be encompassed by the following claims, and their equivalents.

What is claimed is:

1. A method of forming a part that includes a first component and a second component and which two components are diffusion bonded together, the method comprising:
   providing a first component, the first component being configured as a pressure component and includes a first bond land surface;
   providing a separate second component, the second component being configured as a suction component and includes a second bond land surface;
   providing a mandrel, the mandrel including a first surface having a contour that mates with at least a portion of the first component and a second surface having a contour that mates with at least a portion of the second component;
   positioning the first and second components on the mandrel so that the first bond land surface and the second bond land surface are in mating abutment;
   connecting the first component to the second component at discrete locations along a longitudinal length of the first and second components and at a location that is spaced from the first and second bond land surfaces;
   positioning the connected first and second components together with the mandrel in a die assembly, the die assembly including a first die, a second die and a plurality of fastening members for releasably securing the first die to the second die, the first and second dies being formed of a first material having a first coefficient of thermal expansion, the fastening members being formed of a second material having a second smaller coefficient of thermal expansion, at least one of said first and second components formed of a material having a different composition from said first and second dies and said fastening members;
   placing the die assembly in a vacuum furnace for a diffusion bonding cycle;
   evacuating the furnace;
   increasing the temperature of the furnace to a predetermined temperature;
   applying uniform pressure across an interface between the first and second bond land surfaces of the first and second components;
   maintaining a vacuum level, temperature and pressure within the furnace for a predetermined period of time to form a diffusion bond between the first and second bond land surfaces; and
   removing the die assembly including the diffusion bonded first and second components from the furnace.

2. The method as defined in claim 1, wherein said step of applying uniform pressure includes use of a gas-filled container formed of flexible sheet material, the container being positioned between one of the first and second components and one of the first and second dies, wherein pressure within the container is controlled to a predetermined pressure and maintained for a predeteimined time period, wherein the container provides a uniform load to the interface of the first and second bond land surfaces of the first and second components during said formation of said diffusion bond between the first and second bond land surfaces.

3. The method as defined in claim 2, further comprising forming an offset portion on an inner surface of one of the first and second dies and locating at least a portion of the container therein for bond transition.

4. The method as defined in claim 1, wherein said step of applying uniform pressure includes use of the first material and second material of the respective first and second dies and plurality of fastening members, wherein increase of temperature in the furnace causes the first and second dies to expand at a greater rate than the plurality of fastening members, the plurality of fastening members restricting the expansion of the first and second dies during said formation of said diffusion bond between the first and second bond land surfaces.

5. The method as defined in claim 1, further comprising providing at least two fastening members of differing lengths.

6. The method as defined in claim 1, further comprising manufacturing the first and second components from titanium alloy plate stock, wherein the at least one of the first and second components has a non-planar conformation.

7. The method as defined in claim 1, further comprising manufacturing the plurality of fastening members from Haynes 230 alloy and at least one of said first and second die components is fowled of a cast stainless steel material having a higher carbon content than standard cast 309 stainless steel.

8. The method as defined in claim 1, wherein the temperature of the furnace during the formation of said diffusion bond between the first and second bond land surfaces is no more than about 1720° F., the temperature being held above about 1550° F. for up to about 170 minutes.

9. The method as defined in claim 1, wherein the evacuation of the furnace is at least about $5 \times 10^{-4}$ Torr.

10. The method as defined in claim 2, wherein the temperature of the furnace during the formation of said diffusion bond between the first and second bond land surfaces is no more than about 1720° F., the temperature being held above about 1550° F. for up to about 170 minutes, the pressure in the container during the formation of the diffusion bond between the first and second bond land surfaces is increased and then maintained at at least 90 psi for at least about 50 minutes, then increased and then maintained at no more than about 260 psi for at least about 50 minutes, and then decreased and maintained at no more than 210 psi for the remainder of the diffusion bonding cycle.

11. The method as defined in claim 2, further comprising the positioning the connected first and second components and the mandrel on one of the first and second dies and loosely securing the first die to the second die, said first and second dies loosely secured together until the container is pressurized.

12. The method as defined in claim 1, further comprising providing at least two tabs on the first component and at least two tabs on the second component, and aligning the at least two tabs of the first and second components on the mandrel, and connecting the at least two tabs of the first component to the at least two tabs of the second component so that first component to the second component are connected at the discrete locations along the longitudinal length of the first and second components and at a location that is spaced from the first and second bond land surfaces.

13. The method as defined in claim 1, further comprising coating the mandrel and the first and second dies with a release agent.

14. A method of diffusion bonding comprising:
providing a first component including a first bond land surface having a wave-like conformation;
providing a second component including a second bond land surface having a wave-like conformation;
preparing and cleaning the mating first and second bond land surfaces to be diffusion bonded to a predetermined condition such that diffusion bonding across an interface between the surfaces is possible;
connecting the first component to the second component at discrete locations along a longitudinal length of the first and second components and at a location that is spaced from the first and second bond land surfaces so that the first and second bond land surfaces are in mating abutment;
providing a diffusion bonding die assembly configured to releasably secure the connected components therein, the die assembly including a first die, a second die and a plurality of fastening members for releasably securing the first die to the second die;
coating the die assembly and selected portions of the first and second components with a release agent, the coating being absent from the first and second bond land surfaces;
placing the first and second components with the first and second bond land surfaces in mating abutment in the die assembly;
placing the die assembly in a vacuum furnace for a diffusion bonding cycle;
evacuating the furnace;
increasing the temperature of the furnace to a first temperature;
maintaining the first temperature for a predetermined period of time;
increasing the temperature of the furnace to a second temperature, said second temperature greater than the first temperature;
maintaining the second temperature for a predetermined period of time;
applying a first pressure at the second temperature across the interface of the first and second components for a predetermined period of time;
increasing the applied pressure to a second pressure, said second pressure greater than the first pressure;
applying the second pressure at the second temperature across the interface of the first and second components for a predetermined period of time;
decreasing the applied pressure to a third pressure, said third pressure greater than the first pressure;
applying the third pressure at the second temperature across the interface of the first and second components for a predetermined period of time;
decreasing the temperature of the furnace to a third temperature, the third temperature less than the first temperature; and
removing the die assembly including the diffusion bonded first and second components from the furnace.

15. The method as defined in claim 14, wherein the step of applying uniform pressure includes use of a gas-filled container formed of flexible metal sheet material, the container providing a uniform load to the interface the first and second components.

16. The method as defined in claim 15, the material of the first and second components being different from the material of the first and second dies, said material of said fasteners being different from the first and second dies and the first and second components, the first and second dies formed of a first material having a first coefficient of they expansion, the fastening members formed of a second material having a second smaller coefficient of thermal expansion than the expansion coefficient of the first material.

17. The method as defined in claim 16, wherein the step of applying uniform pressure includes the use of the first and second dies and plurality of fastening members, wherein increase of temperature in the furnace causes the first and second dies to expand at a greater rate than the plurality of fastening members, the plurality of fastening members restricting the expansion of the first and second dies which, in turn, at least partially causes the first and second dies to provide a uniform load to the interface of the first and second components.

18. The method as defined in claim 17, wherein the first component and the second component formed from cast titanium alloy, the first and second die components formed from a cast stainless steel material having a higher carbon content than standard cast 309 stainless steel.

19. The method as defined in claim 18, wherein the first temperature is about 1500° F. to about 1550° F. and the container is not pressurized at the first temperature.

20. The method as defined in claim 18, wherein the second temperature is about 1685° F. to about 1715° F., the temperature being held for approximately 150 to approximately 170 minutes, the first pressure applied is about 90 psi to about 110 psi for approximately 50 to 60 minutes, the second pressure applied is about 240 psi to about 260 psi for approximately 50 to 60 minutes, and the third pressure applied is about 190 psi to about 210 psi for the remainder of the diffusion bonding cycle.

21. The method as defined in claim 20, wherein the third temperature is at least about 1000° F.

22. The method as defined in claim 18, wherein the second temperature is about 1685° F. to about 1715° F., the temperature being held for approximately 150 to approximately 170 minutes, the first pressure applied is about 90 psi to about 110 psi for approximately 50 to 60 minutes, the second pressure applied is about 190 psi to about 210 psi for approximately 50 to 60 minutes, and the third pressure applied is about 140 psi to about 160 psi for the remainder of the diffusion bonding cycle.

23. The method as defined in claim 22, wherein the third temperature is at least about 1200° F.

24. The method as defined in claim 18, wherein the coating step includes spraying the die assembly with a boron nitride spray.

25. The method as defined in claim 18, further comprising ultrasonically inspecting a bond area of the diffusion bonded first and second components.

26. A method of forming a part that consists essentially of a first component and a second component and which two components are diffusion bonded together to form a final part, the method comprising:
    providing a first component, said first component including a first bond land surface, said first component having a shape that is substantially a shape of one half said final part, said first component formed of a titanium metal material;
    providing a separate second component, said second component including a second bond land surface, said second bond land surface designed to bond with said first bond land surface of said first component, said second component having a shape that is substantially a shape of one half said final part, said second component formed of a titanium metal material;
    providing a mandrel, said mandrel including a first surface having a contour that mates with at least a portion of said first component and a second surface having a contour that mates with at least a portion of said second component;
    positioning said first and second components on said mandrel so that said first bond land surface and said second bond land surface are in mating abutment, preparing and cleaning said mating first and second bond land surfaces to be diffusion bonded to a predetermined condition such that diffusion bonding across an interface between said surfaces is possible, said preparing and cleaning step occurring prior to said first bond land surface and said second bond land surface being positioned in mating abutment with one another;
    connecting said first component to said second component at a plurality of discreet locations along a peripheral edge of said first and second components and at a location that is spaced from said first and second bond land surfaces, said step of connecting including weld bonding said first component to said second component;
    positioning said connected first and second components and said mandrel in a die assembly, said die assembly including a first die, a second die and a plurality of fastening members for releasably securing said first die to said second die, said first and second dies being formed of a first material having a first coefficient of thermal expansion, said fastening members being formed of a second material having a second smaller coefficient of thermal expansion than said first coefficient of thermal expansion, at least one of said first and second components formed of a material having a different composition from said first and second dies and said fastening members;
    placing said die assembly in a vacuum furnace for a diffusion bonding cycle;
    evacuating said vacuum furnace of gas by applying a vacuum to said die assembly;
    increasing a temperature of said vacuum furnace to a predetermined temperature to heat said die assembly to said predetermined temperature;
    applying a uniform pressure across an interface between said first and second bond land surfaces of said first and second components while said die assembly is at said predetermined temperature;
    maintaining a vacuum level, temperature and pressure within said vacuum furnace for a predetermined period of time to form a diffusion bond between said first and second bond land surfaces, said temperature of said vacuum furnace during said formation of said diffusion bond between said first and second bond land surfaces is no more than about 1720° F., said temperature of said vacuum furnace being held above about 1550° F. for up to about 170 minutes; and,
    removing said die assembly from said vacuum furnace, said die assembly including said first and second components having been bonded together by a diffusion bond formed at said first and second bond land surfaces.

27. The method as defined in claim 26, wherein said step of applying uniform pressure includes use of a gas-filled container formed of flexible sheet material, said container being positioned between one of said first and second components and one of said first and second dies, wherein pressure within said container is controlled to a predetermined pressure and maintained for a predetermined time period, wherein said container provides a uniform load to said interface of said first and second bond land surfaces of said first and second components during said formation of said diffusion bond between said first and second bond land surfaces, at least one of said first and second components having a non-planar conformation.

28. The method as defined in claim 27, wherein said pressure in said container during said formation of said diffusion bond between said first and second bond land surfaces is increased and then maintained at at least 90 psi for at least about 50 minutes, then increased and then maintained at no more than about 260 psi for at least about 50 minutes, and then decreased and maintained at no more than 210 psi for a remainder of said diffusion bonding cycle.

29. The method as defined in claim 26, wherein said step of applying uniform pressure includes use of a first material and a second material of said respective first and second dies and plurality of fastening members, wherein increase of temperature in said vacuum furnace causes said first and second dies to expand at a greater rate than a plurality of said fastening members, said plurality of fastening members restricting said expansion of said first and second dies during said formation of said diffusion bond between said first and second bond land surfaces.

30. The method as defined in claim 26, including the step of coating said die assembly and selected portions of said first and second components with a release agent, said coating being absent from said first and second bond land surfaces.

31. The method as defined in claim 26, wherein said step of maintaining said vacuum level, temperature and pressure within said vacuum furnace for said predetermined period of time to form said diffusion bond between said first and second bond land surfaces includes the steps of i) increasing said temperature of sad vacuum furnace to a first temperature, ii) maintaining said first temperature for a first predetermined period of time, iii) increasing said temperature of said vacuum furnace to a second temperature, said second temperature greater than said first temperature, iv) maintaining said second temperature for a second predetermined period of time, v) applying a first pressure at said second temperature across said interface of said first and second components for third predetermined period of time, vi) increasing said applied pressure to a second pressure, said second pressure greater than said first pressure, vii) applying said second pressure at said second temperature across said interface of said first and second components for a fourth predetermined period of time, viii) decreasing said applied pressure to a third pressure, said third pressure greater than said first pressure, ix) applying said third pressure at said second temperature across said interface of said first and second components for a fourth predetermined period of time, and x) decreasing said temperature of said vacuum furnace to a third temperature, said third temperature less than said first temperature.

32. The method as defined in claim 31, wherein said third temperature is at least about 1000° F., wherein said second temperature is about 1685° F. to about 1715° F., said second predetermined period of time is about 150-170 minutes, said first pressure is about 90-110 psi, said third predetermined period of time is about 50-60 minutes, said second pressure is about 190-210 psi, said fourth predetermined period of time is about 50-60 minutes, said third pressure is about 140-160 psi, said third temperature is at least about 1200° F.

\* \* \* \* \*